(12) United States Patent
Yee et al.

(10) Patent No.: US 6,392,140 B1
(45) Date of Patent: May 21, 2002

(54) HINGED PILOT DEVICE DOOR AND BRACKET ASSEMBLY

(75) Inventors: Edgar Yee, Chapel Hill; Charles Piper, Burlington; Lloyd E. Wentler, Efland; Gilbert A. Soares, Mebane, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/560,487

(22) Filed: Apr. 28, 2000

(51) Int. Cl.[7] ................................................. H01J 15/00
(52) U.S. Cl. ............................. 174/50; 174/66; 312/109
(58) Field of Search ............................... 174/66, 67, 61, 174/50, 57; 220/3.3, 3.9, 3.92, 3.94, 4.02, 326, 242, 3.8, 307; 312/107, 108, 308, 310, 109

(56) References Cited

U.S. PATENT DOCUMENTS

| | | | | |
|---|---|---|---|---|
| 3,618,804 A | * | 11/1971 | Krause | 174/66 |
| 4,034,169 A | | 7/1977 | Armstrong et al. | |
| 4,051,340 A | | 9/1977 | Wolski | |
| 4,134,516 A | * | 1/1979 | Sullo | 174/67 |
| 4,712,157 A | * | 12/1987 | Simonson et al. | 220/3.3 |
| 4,979,634 A | * | 12/1990 | Begley | 220/242 |
| 5,156,291 A | * | 10/1992 | Mielke | 220/326 |
| 5,228,584 A | * | 7/1993 | Williams, Jr. | 174/67 |
| 5,245,507 A | * | 9/1993 | Ericksen | 174/67 |
| 5,276,284 A | | 1/1994 | Carpenter | |
| 5,317,108 A | * | 5/1994 | Prairie, Jr. | 174/67 |
| 5,355,626 A | | 10/1994 | Sachs | |
| 5,358,135 A | | 10/1994 | Robbins et al. | |
| 5,625,531 A | * | 4/1997 | Padilla et al. | 361/623 |
| 5,761,027 A | | 6/1998 | Flegel | |
| 5,769,006 A | * | 6/1998 | Allaer | 220/3.3 |
| 5,910,642 A | * | 6/1999 | Daoud | 174/57 |
| 5,929,379 A | * | 7/1999 | Reiner et al. | 174/66 |
| 5,986,211 A | * | 11/1999 | Greer et al. | 174/66 |
| 6,131,760 A | * | 12/2000 | Huang | 220/326 |
| 6,176,385 B1 | * | 1/2001 | Feese et al. | 220/326 |
| 6,206,221 B1 | * | 3/2001 | Bando et al. | 220/326 |

\* cited by examiner

*Primary Examiner*—Dean A. Reichard
*Assistant Examiner*—Angel R. Estrada
(74) *Attorney, Agent, or Firm*—Cantor Colburn LLP

(57) ABSTRACT

An access door for an electrical enclosure is disclosed. The access door includes a hinge mechanism extending from the access door, the hinge mechanism defining an aperture including a support surface within the aperture, a flange extending from the enclosure and engaged within the aperture wherein the flange makes contact with the support surface when the door is in a fully open position to support the access door against the force of gravity.

28 Claims, 5 Drawing Sheets

HINGED PILOT DEVICE DOOR AND BRACKET ASSEMBLY

BACKGROUND OF THE INVENTION

This invention relates to a hinged pilot device door and bracket assembly of an electrical enclosure allowing for removal of the door from the enclosure.

Electrical enclosures containing electrical devices and connections require convenient access thereto for ease of wiring at the assembly point and ease of maintenance and trouble shooting in the field. Such access can be provided by a swing-away door over an access opening. However, it is also desireable to provide the ability to allow the door to rotate from a closed position to an open position and vise versa, while allowing for the separate removal of the door from the electrical enclosure.

U.S. Pat. No. 5,761,027 discloses a load center having an enclosure provided with a back wall and a swingable access door, a bus panel secured within the enclosure and a plurality of circuit breakers mounted to the bus panel for switching power between an electrical utility and an auxiliary power source. U.S. Pat. No. 5,355,626 discloses an access panel assembly with a door and multi-functional frame which prevents sagging and warping of the door from the frame, and which is more safely and easily installed in both new and existing building structures. U.S. Pat. No. 5,358,135 discloses that an enclosure for electrical or electronic devices having components requiring periodic adjustment is provided with an access opening to the adjustments for the components including a hinged attachable door for closing and sealing the access opening.

BRIEF SUMMARY OF THE INVENTION

An access door for an electrical enclosure is disclosed. The access door comprises a hinge mechanism extending from the access door, the hinge mechanism defining an aperture including a support surface within the aperture, a flange extending from the enclosure and engaged within the aperture wherein the flange makes contact with the support surface when the door is in a fully open position to support the access door against the force of gravity.

DETAILED DESCRIPTION OF THE INVENTION

Figure 1:
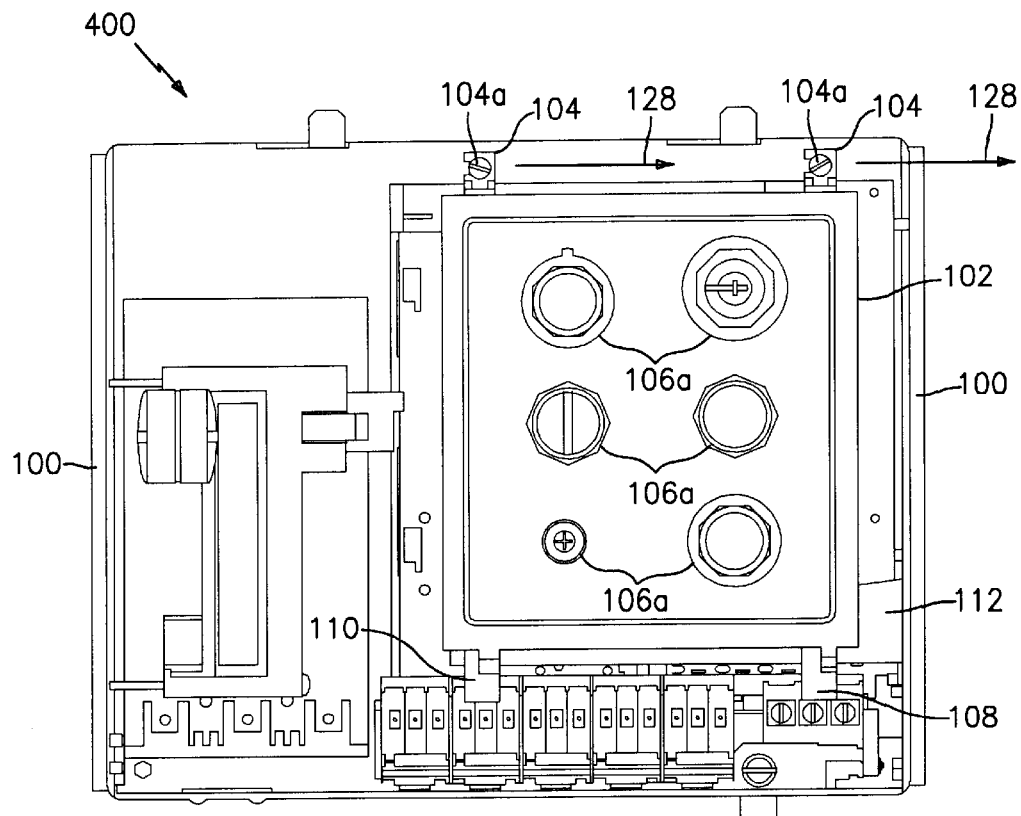
FIG. 1 is a front view of an electrical enclosure with a door of the present invention mounted thereto.
Figure 2:
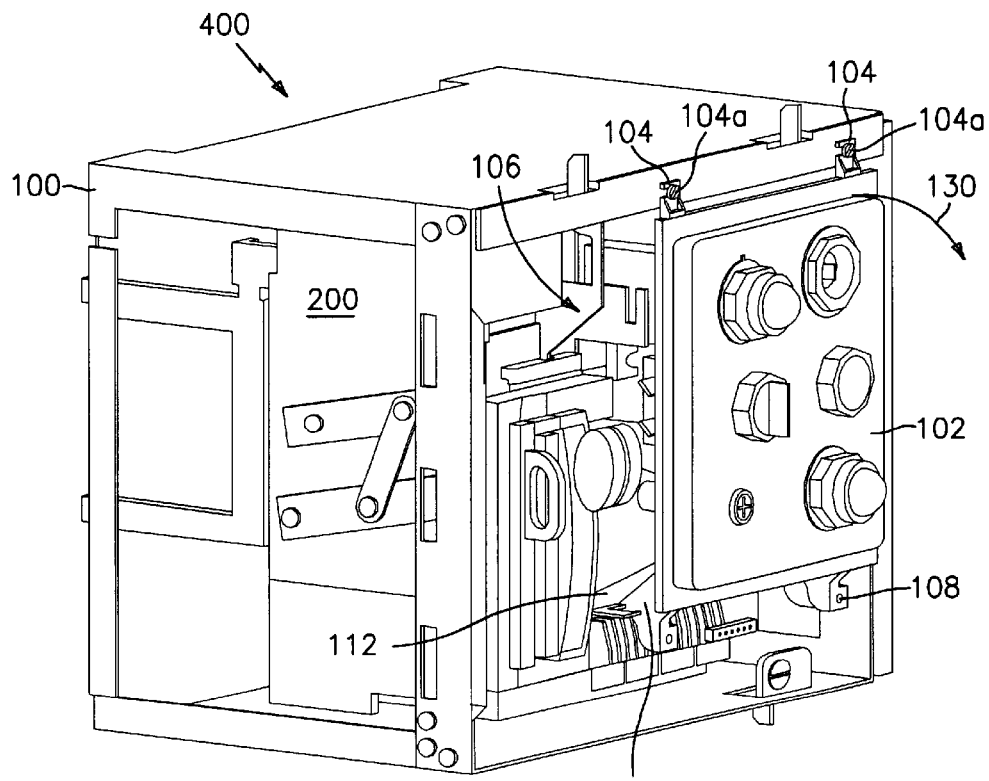
FIG. 2 is a three dimensional view of the electrical enclosure of FIG. 1 showing the door mounted thereto.

In FIGS. 1 and 2 an electrical enclosure 400 is shown. The electrical enclosure 400 is comprised of a housing 100 defining interior volume 200. Disposed within the interior volume 200 is a plurality of electrical connections and devices 106. An access door 102 is disposed at one face of the housing 100 and slidably connected thereto by way of a pair of clips 104. The clips 104 are in the nature of a backwardlike "C" and accept a pair of screws or rivets 104a affixed to the housing 100. A plurality of electronic pilot devices 106a are mounted on the access door 102. The electronic pilot devices 106a are electrically connected to electrical devices 106 via wires (not shown). Each of the electronic pilot devices 106a includes an interface portion, such as a light or switch, that is visible when door 102 is closed, and an electrical portion 106b that is accessible only by opening the door 102. The connection lugs for electrically connecting electronic pilot devices 106a electrical portion 106b includes for example, electrical devices 106. The access door 102 includes a first hinge mechanism 108 and a second hinge mechanism 110 rotatably secured to a bracket 112. The bracket 112 is mounted to the housing 100. Thus the assembly of the access door 102, the clips 104, the screws or rivets 104a and the bracket 112, is such as to allow the access door 102 to open away from the housing 100 by a first movement across the face of the housing 100 as indicated by the reference numeral 128 in FIG. 1. When the clips 104 of the access door 102 are clear of the screws or rivets 104a, the access door 102 may swing away from the housing 100 as indicated by the reference numeral 130 in FIG. 2. When opened, access door 102 allows access to electrical devices 106 and to the electrical portion 106b of electronic pilot devices 106a.

Figure 3:
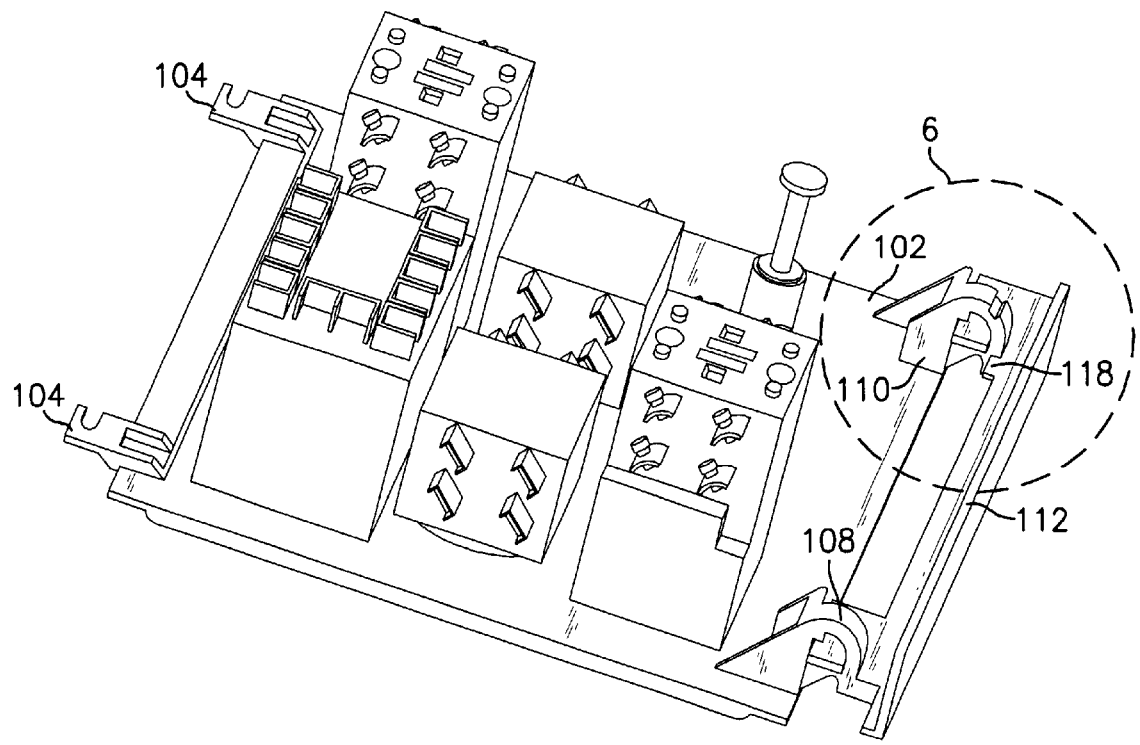
FIG. 3 is a three dimensional view of the door of FIG. 1 and a bracket mated thereto dismounted from the electrical enclosure and viewed approximately in opposition to the view of FIG. 2.
Figure 4:
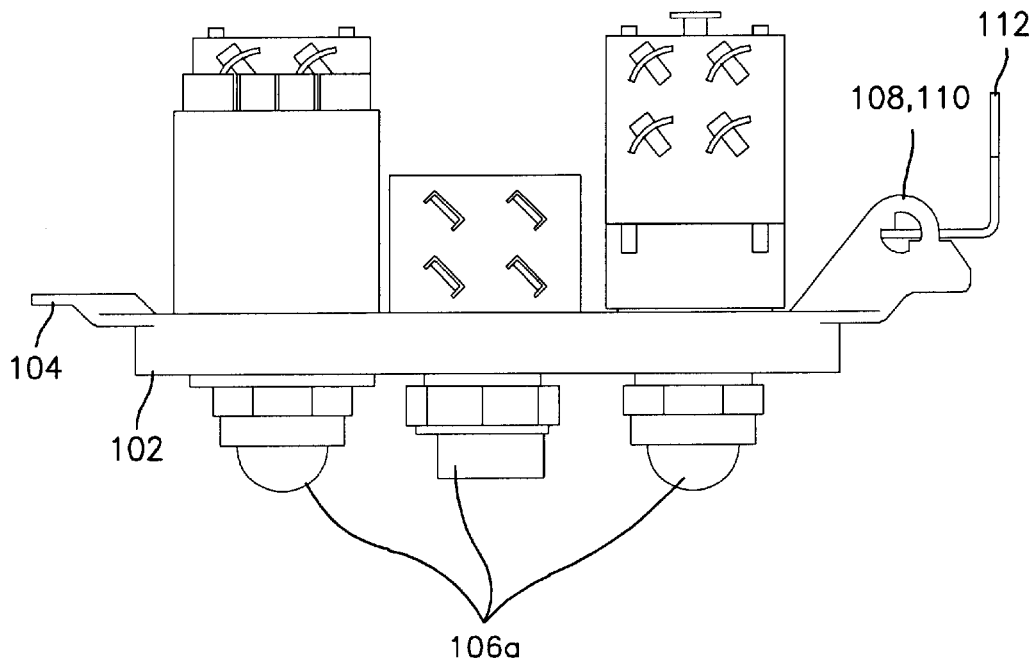
FIG. 4 is a side view of the door of FIG. 3 mated to the bracket.

In FIGS. 3 and 4, the access door 102 and bracket 112 are shown divorced from the housing 100 and coupled to one another at the first hinge mechanism 108 and the second hinge mechanism 110. The electrical portion 106b of each electronic pilot devices 106a includes various connections. As best understood from FIGS. 3 and 4, the bracket 112 is normally affixed to the housing 100 and the access door 102 rotates with respect to the bracket 112.

Figure 5:
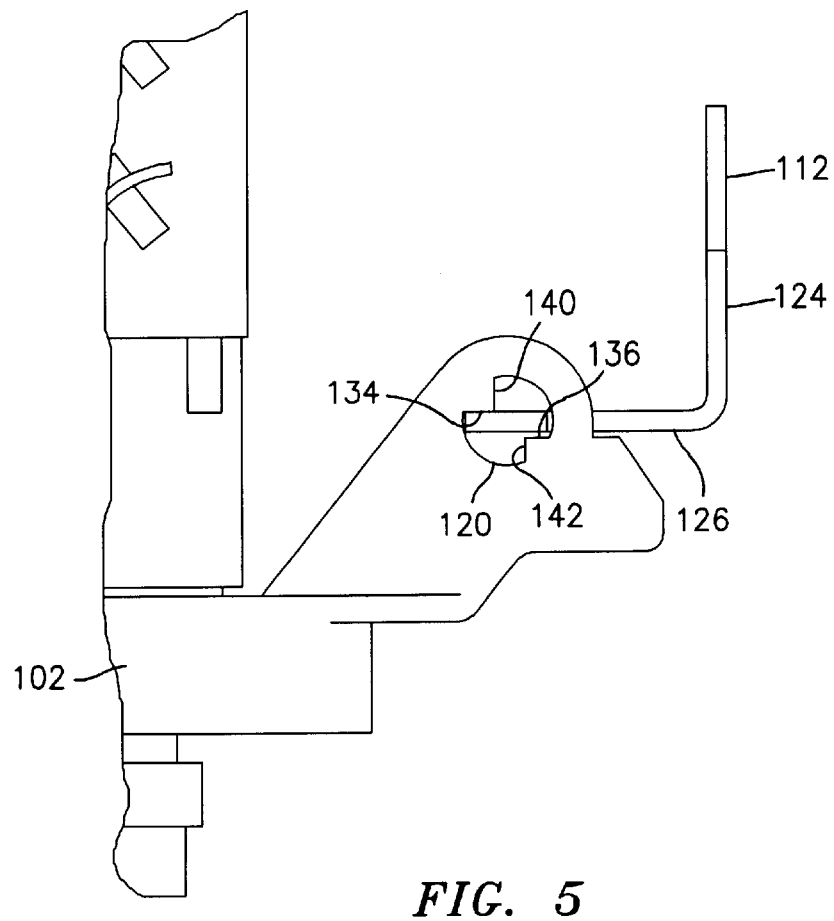
FIG. 5 is an enlarged view of a section of the door and bracket of FIG. 4.
Figure 6:
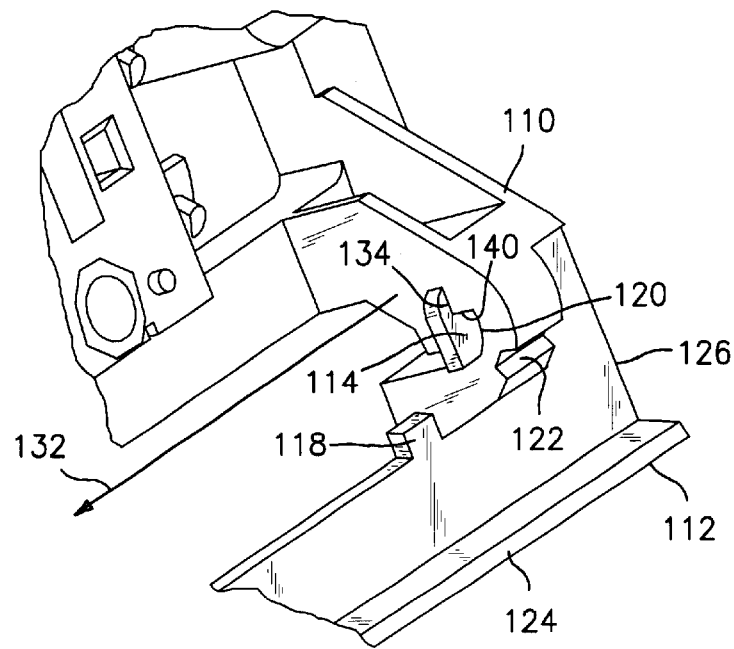
FIG. 6 is a three dimensional view of a section of the bracket mated to the door.

FIG. 5 shows an enlarged side view of the access door 102 and bracket 112 assembly. The bracket 112 is comprised of a first surface 124 and a second surface 126 which are substantially at right angles to one another. The first surface 124 of the bracket 112 is the surface affixed to the housing 100. The first hinge mechanism 108 and the second hinge mechanism 110 include an aperture 120 that acts as a receptacle for a first flange 114 and a second flange 116 disposed on the second surface 126 of the bracket 112. Thus, the bracket 112 is pivotably secured to the access door 102 by way of the first hinge mechanism 108 and the second hinge mechanism 110 coupled to the first flange 114 and the second flange 116. As the access door 102 rotates from the closed position shown in FIG. 1 to the open position of FIGS. 3–6, the access door 102 rotates with respect to the bracket 112 at the first hinge mechanism 108 and the second hinge mechanism 110 such that the first hinge mechanism 108 and the second hinge mechanism 110 limit the travel of the access door 102 through approximately 90 degrees to the open position.

Figure 7:
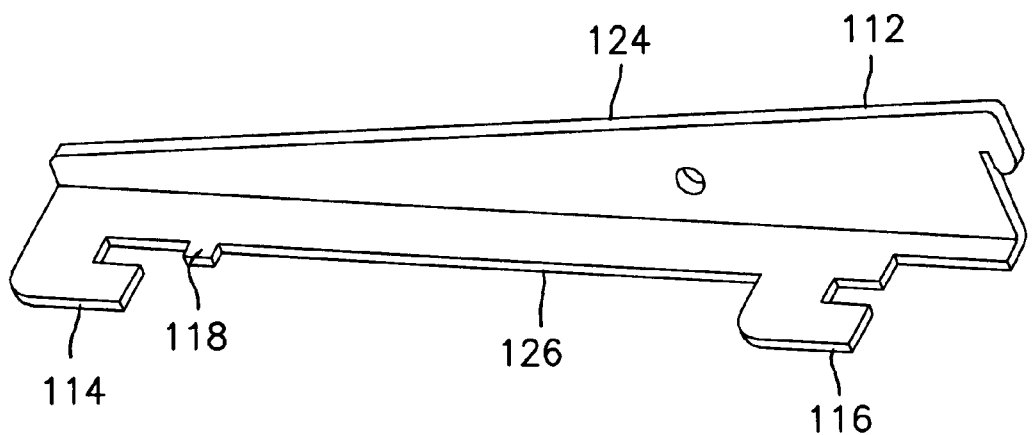
FIG. 7 is a three dimensional view of the bracket.
Figure 8:
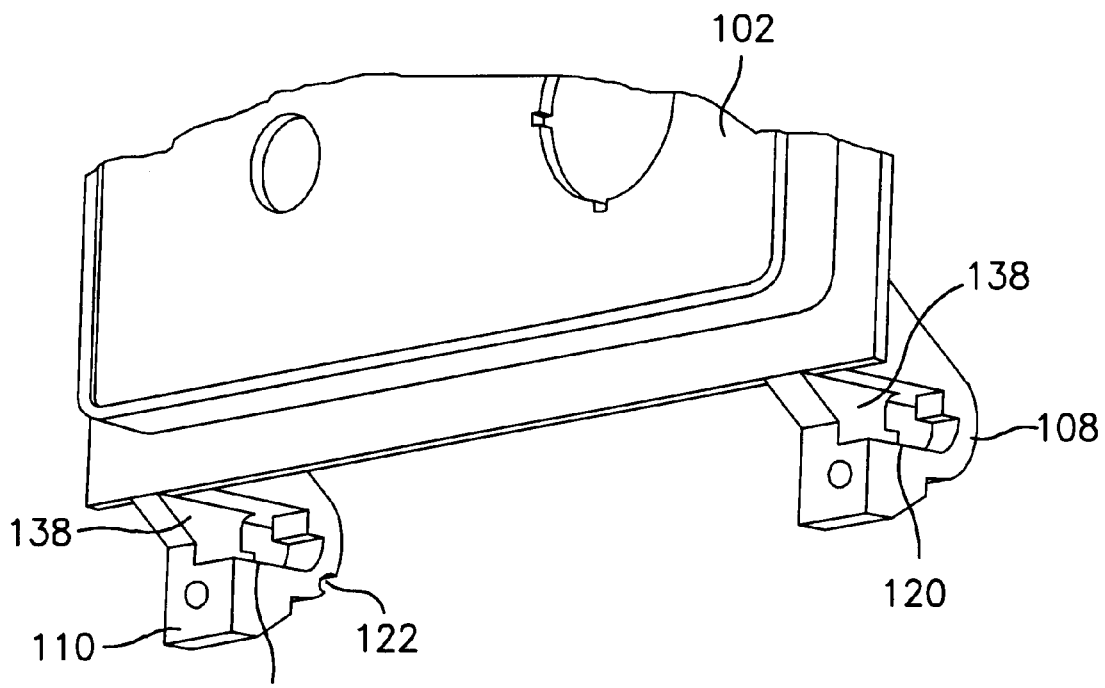
FIG. 8 is a three dimensional view of a section of the door of FIG. 1 divorced from the electrical enclosure.

Referring to FIG. 7, the bracket 112 is comprised of the first flange 114, the second flange 116 and a tab 118. The first flange 114 and the second flange 116 are operative to slidably and rotatably mate with the aperture 120 of the second hinge mechanism 110 and first hinge mechanism 108 respectively. The tab 118 is disposed on the bracket 112 proximate the first flange 114. The tab 118 is located a distance from an end of the first flange 114 as measured in the direction indicated by arrow 132 to allow hinge mechanism 110 to slide in the direction of arrow 132, while preventing hinge mechanism 110 from sliding so far as to release the first and second flanges 114, 116 from apertures 120 of hinge mechanisms 108, 110. A slot 122 is provided on the second hinge mechanism 110 and shown in FIGS. 6, 7 and 8. As best understood from FIGS. 6, 7 and 8, as the access door 102 rotates with respect to the bracket 112, the tab 118 comes into alignment with the slot 122. At the point of alignment, the access door 102 can be disengaged from the bracket 112 along the direction indicated by the reference numeral 132 in FIG. 6. The angle subtended by the access door 102 (with respect to the open or closed position) at alignment (or disengagement) may be any value, but is approximately 45 degrees. It will be appreciated that the access door 102 can be reengaged with the housing 100 and bracket 12 and secured thereto by reversing the steps outlined above.

The aperture 120 of the first and second hinge mechanisms 108, 110 is such as to receive the first and second flanges 114, 116. The aperture 120 comprises a first surface 134 and a second surface 136 substantially parallel to the first surface 134. The first and second surfaces 134, 136 are such as to abut the first flange 114 on opposing surfaces thereof and to prevent the further rotation of the access door 102 when the access door 102 is in the open position. The first surface 134 and the second surface 136 of the aperture 120 are perpendicular to a plane 138. The aperture 120 further comprises a third surface 140 perpendicular to the first surface 134 and a fourth surface 142 perpendicular to the second surface 136. The third surface 140 and the fourth surface 142 are substantially parallel to one another and perpendicular to the plane 138. The third and fourth surfaces 140, 142 are such as to abut the first flange 114 on opposing surfaces thereof and to prevent the further rotation of the access door 102 when the access door 102 is in the closed position. When viewed perpendicular to the plane 138 the aperture 120 is such as to appear in the general form of a "bowtie," as seen in FIG. 5.

The hinged pilot device door and bracket assembly of the present invention allows the door 102 to rotate from a closed position to an open position (and vice versa), while allowing for the separate removal of the door 102 from the electrical enclosure 400. As described hereinabove, the door 102 can be opened by sliding the door 102 across the face of the electrical enclosure 400 until the clips 104 are released from the screws or rivets 104a. The tab 118 prevents the door 102 from sliding so far that the flanges 114, 116 are released from the apertures 120 in the hinge mechanisms 108, 110. Once the clips 104 are released from the screws or rivets 104a, the door 102 can be pivoted downward. If removal of the door 102 is required, the door 102 is pivoted downward until the slot 122 in hinge mechanism 110 is aligned with the tab 118, at which point the door 102 can be slid further across the enclosure 100 to release the flanges 114, 116 from the apertures 120 in the hinge mechanisms 108, 110. If door 102 is not to be removed, the door 102 is pivoted downward until the flanges 114, 116 contact the surfaces 134, 136 formed on the inside of the apertures 120 within the hinge mechanisms 108, 110. With the flanges 114, 116 contacting the surfaces 134, 136, the door 102 is in the fully open position. In the embodiment shown, this position is approximately 90 degrees from the fully closed position. Thus, in the fully open position, the door 102 is held by the force of gravity in a position that is convenient for technicians to install and maintain the electrical devices 200 mounted within the enclosure 400 and the pilot devices 106a mounted to the door 102.

Figure 9:
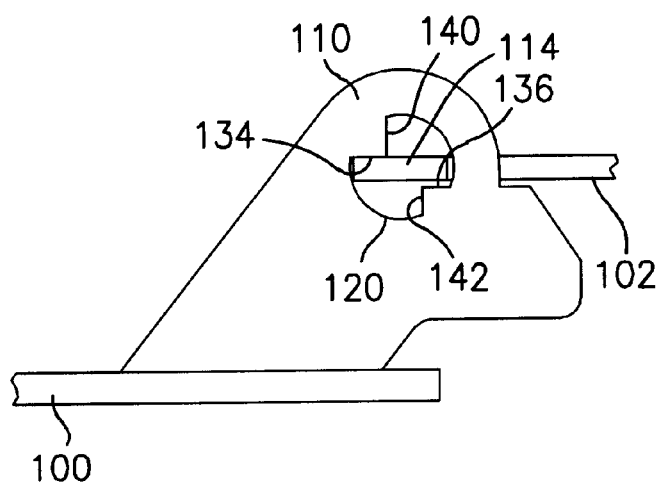
FIG. 9 is a side view of an alternative embodiment of the bracket.
Figure 10:
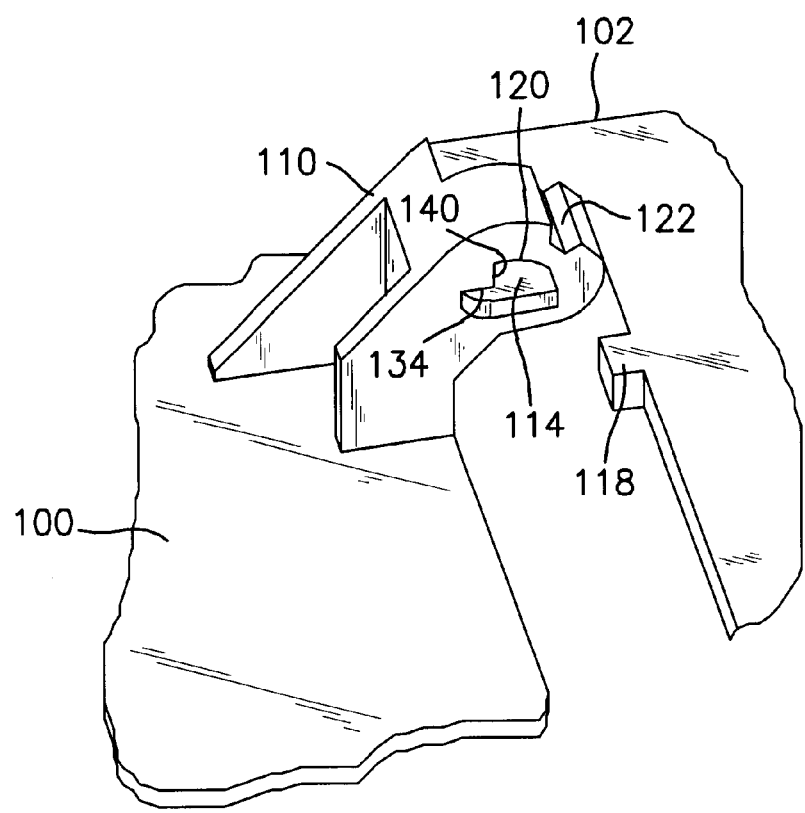
FIG. 10 is a three dimensional view of the bracket of FIG. 9.

Referring to FIGS. 9 and 10, an embodiment is shown wherein hinge mechanism 110 extends from the housing 100 and flange 114 extends from the access door 102. The hinge mechanism 110 defines an aperture 120 including support surfaces 134 and 136 formed therein. Flange 114 is pivotally engaged within the aperture 120. The flange 114 makes contact on opposing surfaces thereof with the support surfaces 134 and 136 preventing further rotation of the access door 102 when the door 102 is in the fully open, horizontal position, thus supporting the access door 102 against the force of gravity.

The flange 114 slides within the aperture 120 to release the clip 104 (FIG. 1). To prevent the flange 114 from sliding out of the aperture 120, tab 118 is secured to the housing 100. Slot 122 in hinge mechanism 110 allows the flange 114 to slide out the aperture 120 when the slot 122 is aligned with the tab 118, thereby allowing the access door 102 to be removed.

It will be appreciated that the access door disclosed herein is not limited to use with an electrical enclosure. The access door described herein has wide applicability to any enclosure having an interior volume requiring access thereto or system whereby a door may be allowed to rotate over an angular extent to a prescribed position and optionally removed from the enclosure or system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An access door for an electrical enclosure, the access door comprising:

a hinge mechanism extending from the access door, the hinge mechanism defining an enclosed aperture including a horizontal support surface within the aperture; and a flange extending from the enclosure and pivotally engaged within the aperture wherein the flange makes contact with the horizontal support surface when the door is in a fully open horizontal position to support the access door against the force of gravity.

2. The access door as set forth in claim 1 further comprising a clip for releasably securing the access door to the enclosure.

3. The access door as set forth in claim 2 wherein the flange is disposed to slide within the aperture to release the clip.

4. The access door as set forth in claim 3 further comprising a tab secured to the enclosure to prevent the flange from sliding out of the aperture.

5. The access door as set forth in claim 4 further comprising a slot in the hinge mechanism to allow the flange to slide out of the aperture when the slot is aligned with the tab, thereby allowing the access door to be removed.

6. The access door as set forth in claim 1 further comprising a plurality of pilot devices mounted to the access door.

7. An access door for an electrical enclosure, the access door comprising:
- a hinge mechanism extending from the access door, the hinge mechanism defining an enclosed aperture;
- a flange extending from the enclosure, the flange extending within the aperture;
- a tab extending from the flange for preventing the flange from disengaging from the aperture; and
- a slot in the hinge mechanism to allow the flange to slide out of the aperture when the slot is aligned with the tab, thereby allowing the access door to be removed from the enclosure.

8. The access door as set forth in claim 7 further comprising a plurality of pilot devices mounted to the access door.

9. An access door for an electrical enclosure, the access door comprising:
- a hinge mechanism extending from the enclosure, the hinge mechanism defining an enclosed aperture including a support surface within the aperture; and
- a flange extending from the access door and pivotally engaged within the aperture wherein the flange makes contact on opposing surfaces thereof with the support surface to prevent the further rotation of the access door when the door is in a fully open position horizontal to support the access door against the force of gravity.

10. The access door as set forth in claim 9 further comprising a clip for releasably securing the access door to the enclosure.

11. The access door as set forth in claim 10 wherein the flange is disposed to slide within the aperture to release the clip.

12. The access door as set forth in claim 11 further comprising a tab secured to the enclosure to prevent the flange from sliding out of the aperture.

13. The access door as set forth in claim 12 further comprising a slot in the hinge mechanism to allow the flange to slide out of the aperture when the slot is aligned with the tab, thereby allowing the access door to be removed.

14. The access door as set forth in claim 9 further comprising a plurality of pilot devices mounted to the access door.

15. An access door for an electrical enclosure, the access door comprising:
- a hinge mechanism extending from the enclosure, the hinge mechanism defining an enclosed aperture;
- a flange extending from the access door, the flange extending within the aperture;
- a tab extending from flange for preventing the flange from disengaging from the aperture; and
- a slot in the hinge mechanism to allow the flange to slide out of the aperture when the slot is aligned with the tab, thereby allowing the access door to be removed from the enclosure.

16. The access door as set forth in claim 15 further comprising a plurality of pilot devices mounted to the access door.

17. An electrical enclosure comprising:
- a housing defining an interior volume;
- an access door including
  - a hinge mechanism extending from the access door, the hinge mechanism defining an enclosed aperture including a horizontal support surface within the aperture; and
  - a flange extending from the enclosure and pivotally engaged within the aperture wherein the flange makes contact with the horizontal support surface when the door is in a fully open horizontal position to support the access door against the force of gravity.

18. The electrical enclosure as set forth in claim 17 further comprising a clip for releasably securing the access door to the enclosure.

19. The electrical enclosure as set forth in claim 18 wherein the flange is disposed to slide within the aperture to release the clip.

20. The a electrical enclosure as set forth in claim 19 further comprising a tab secured to the enclosure to prevent the flange from sliding out of the aperture.

21. The electrical enclosure as set forth in claim 20 further comprising a slot in the hinge mechanism to allow the flange to slide out of the aperture when the slot is aligned with the tab, thereby allowing the access door to be removed.

22. The electrical enclosure as set forth in claim 17 further comprising a plurality of pilot devices mounted to the access door.

23. An electrical enclosure comprising:
- a housing defining an interior volume;
- an access door connected to the housing, the access door comprising:
  - a hinge mechanism extending from the enclosure, the hinge mechanism defining an enclosed aperture including a support surface within the aperture; and
  - a flange extending from the access door and pivotally engaged within the aperture wherein the flange makes contact on opposing surfaces thereof with the support surface to prevent the further rotation of the access door when the door is in a fully open horizontal position to support the access door against the force of gravity.

24. The electrical enclosure as set forth in claim 23 further comprising a clip for releasably securing the access door to the enclosure.

25. The electrical enclosure as set forth in claim 24 wherein the flange is disposed to slide within the aperture to release the clip.

26. The electrical enclosure as set forth in claim 25 further comprising a tab secured to the enclosure to prevent the flange from sliding out of the aperture.

27. The electrical enclosure as set forth in claim 26 further comprising a slot in the hinge mechanism to allow the flange to slide out of the aperture when the slot is aligned with the tab, thereby allowing the access door to be removed.

28. The electrical enclosure as set forth in claim 23 further comprising a plurality of pilot devices mounted to the access door.

* * * * *